May 1, 1962 J. R. OISHEI ET AL 3,032,019
WINDSHIELD CLEANING SYSTEM

Original Filed Oct. 14, 1954 2 Sheets-Sheet 1

INVENTORS:
JOHN R. OISHEI,
MARTIN BITZER and
ANTHONY C. SCINTA

BY: Beau, Brooke, Buckley & Beau,
ATTORNEYS.

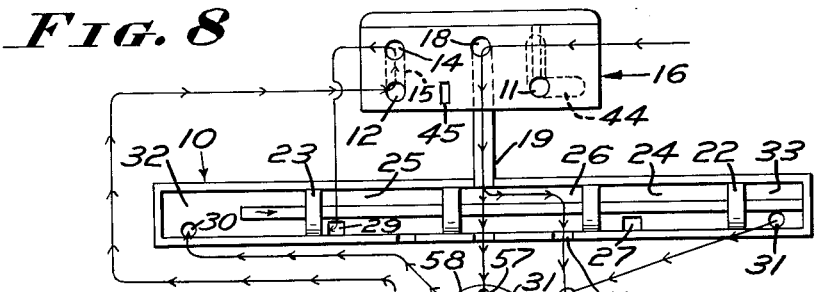
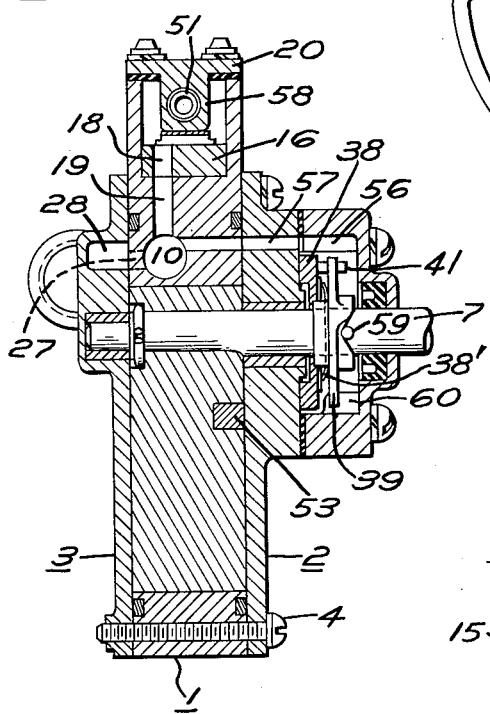
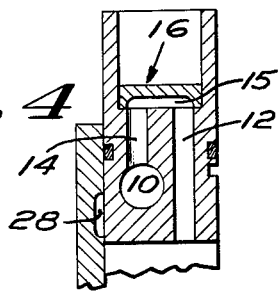
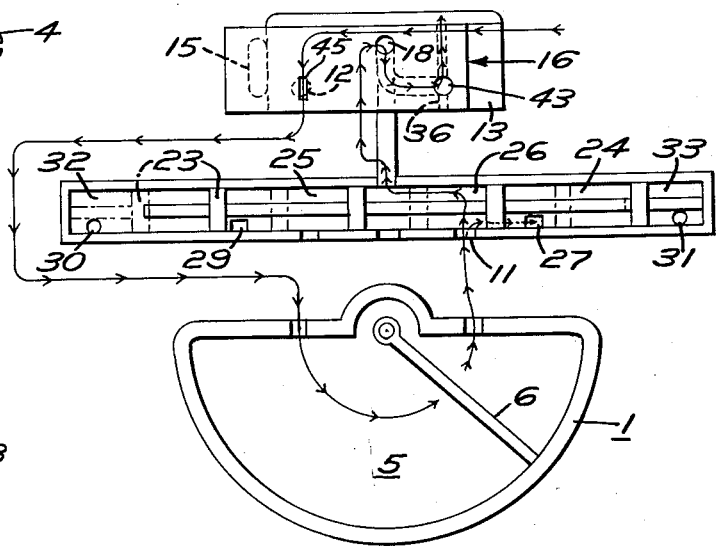
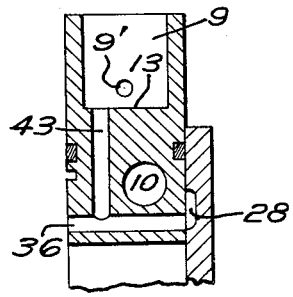

United States Patent Office 3,032,019
Patented May 1, 1962

3,032,019
WINDSHIELD CLEANING SYSTEM
John R. Oishei, Buffalo, Martin Bitzer, Kenmore, and Anthony C. Scinta, Hamburg, N.Y., assignors to Trico Products Corporation, Buffalo, N.Y.
Original application Oct. 14, 1954, Ser. No. 462,208, now Patent No. 2,802,232, dated Aug. 13, 1957. Divided and this application Aug. 8, 1957, Ser. No. 676,954
15 Claims. (Cl. 121—97)

This invention relates to windshield cleaner motors and more particularly to one designed for operation by hydraulic pressure, the same being a division of our co-pending application for patent on a Windshield Cleaning System filed October 14, 1954, under Serial No. 462,-208, now Patent No. 2,802, 232, issued August 13, 1957.

The present day motor vehicles with their deeply curved windshields of the panoramic type have necessitated the use of larger and heavier wiping equipment including wiper motors having a greater torque output to move the longer wiping blades back and forth over the frontal and side areas. The more commonly used vacuum and electric motors have torque limitations. Hydraulic actuation has heretofore been proposed but a satisfactory source of hydraulic pressure has not been discovered for such accessory use until the shown combination of plural pumps disclosed in the parent application. The hydraulic fluid of an automatic transmission provides a dependable source for driving heavier torque-producing wiper equipment in a practical and effective manner. This secondary use of the hydraulic fluid for powering windshield wiper motors thus offers a major economy by utilizing by-product power of the hydraulically operated transmission.

The primary object of the present invention is to provide a wiper motor driven by fluid pressure, which oscillates the wiper arms and blades with ample torque, and which produces selective speed of blade movement under control of a fluid throttle governing the travel of the blade throughout a substantially increased wiping pattern that covers a wide field of vision characteristic of the panoramic or wrap-around type of windshield.

A further object of the invention is to provide a wiper motor capable of moving the heavier wiper load imposed by the longer blade and arm equipment, the torque being sufficient at all times to provide desirable frequency of wiping.

Another object of the invention is to provide a hydraulically actuated windshield cleaner motor having a motor chamber with a piston movable back and forth therein, a pressure responsive spool-type shuttle valve for operatively admitting operating pressure to the motor chamber, the shuttle valve being responsive to differential pressures controlled by a piston actuated pilot valve, and a pressurized control valve for turning the motor on and off and movable to a parking position for admitting fluid pressure to the motor chamber whereby the wiper means may be hydraulically positioned in a parked location outside the range of its usual operating path.

A still further object of the invention is to provide a hydraulic windshield cleaner motor which is capable of high speed actuation while maintaining quietness in operation.

The foregoing and other objects will manifest themselves as this description progresses, reference being had to the accompanying drawings, wherein:

FIG. 3 is a transverse sectional view through the motor taken about on line 3—3 of FIG. 1;

Figure 2:
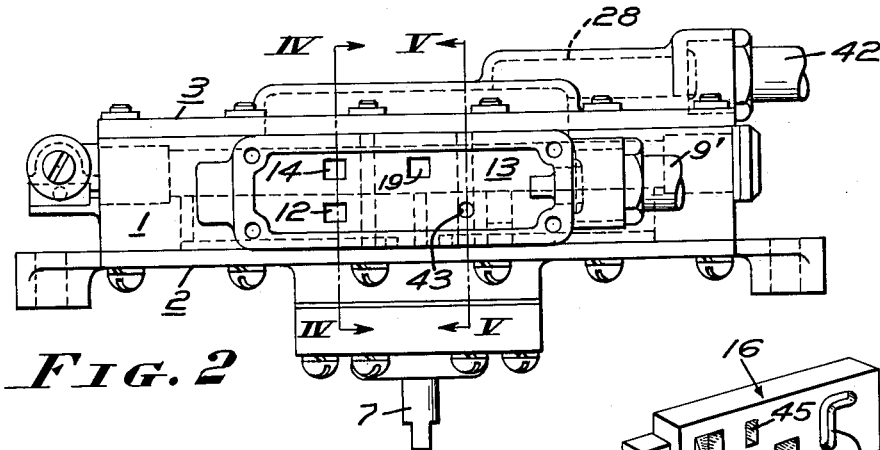
FIG. 2 is a top plan view of the cleaner motor with the control valve and its cover plate removed.
Figure 6:
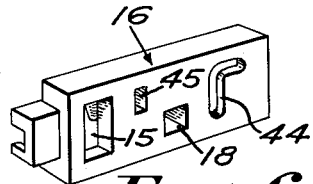
Figure 7:
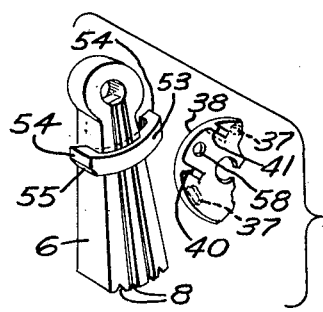

FIGS. 4 and 5 are detail sectional views taken about on lines 4—4 and 5—5 of FIG. 2, respectively;

FIG. 6 is a detail perspective view of the control valve showing the port connecting recesses thereof;

FIG. 7 is an exploded perspective view of the piston with its cushioning valve and the pilot valve control;

FIG. 8 is a view showing diagrammatically the porting arrangement for motor operation; and FIG. 9 is another diagrammatic showing of the porting arrangement for wiper parking.

Referring more particularly to the accompanying drawings, the wiper motor has a housing composed of a body section 1 and opposing heads 2 and 3 clamped together by bolts 4 to form a motor chamber 5 for receiving the vane piston 6 fixed on the motor shaft 7. The marginal surface areas of the piston are formed with oil collecting grooves 8 for holding clearance sealing fluid. The body section 1 is provided with a pressurized control valve chamber 9 and a shuttle valve chamber 10, the latter having direct communication with the motor chamber through a combined inlet and outlet port 11 to one side of the piston. A second combined inlet and outlet port 12 leads from the opposite side of the piston and opens into the control valve chamber 9 through a valve seat 13 alongside a second port 14 from the shuttle valve chamber 10. These two ports 12 and 14 are connectible by a transverse recess 15 in the control valve 16 for admitting pressure fluid to the motor chamber 5 at the opposite side of the piston. The control valve is slidable upon the seat 13 by means of a push-pull flexible member 17 and is also provided with the pressure supply port 18 for registering with a port 19 leading from the valve seat 13 into the valve chamber 10. When the control valve is in its running position, the fluid pressure will be transmitted through port 19 into the chamber 10 for operative distribution by the shuttle valve. The valve chamber 9 is closed liquid tight by a removable cover plate 20 and packing 20' to hold the pressure supplied through an inlet conduit 9'.

Within the chamber 10 is arranged a pressure reversing shuttle valve 21 of the spool type having pressure heads 22 and 23 and intervening lands defining two port-connecting exhaust recesses 24 and 25 and a medial port-connecting recess 26, which latter is always under pressure when the control valve is in its running position wherein the port 19 registers with the pressure supply port 18. The medial recess 26 establishes communication directly between the supply port 19 and the chamber port 11 when the shuttle valve 21 is in one position, and indirectly between the port 19 and the other chamber port 12 through recess 15 and port 14 when the shuttle valve is in its other position, in which latter position the fluid flow being from the pressurized control valve chamber 9 through ports 18, 19, medial recess 26, port 14, recess 15 and chamber port 12 into the motor chamber 5 to cause the piston to move in a counterclockwise direction, during which movement hydraulic fluid in front of the piston will be driven out through the companion champer port 11, the communicating exhaust recess 24 and an exhaust port 27 that discharges into the outlet passage 28.

Figure 1:
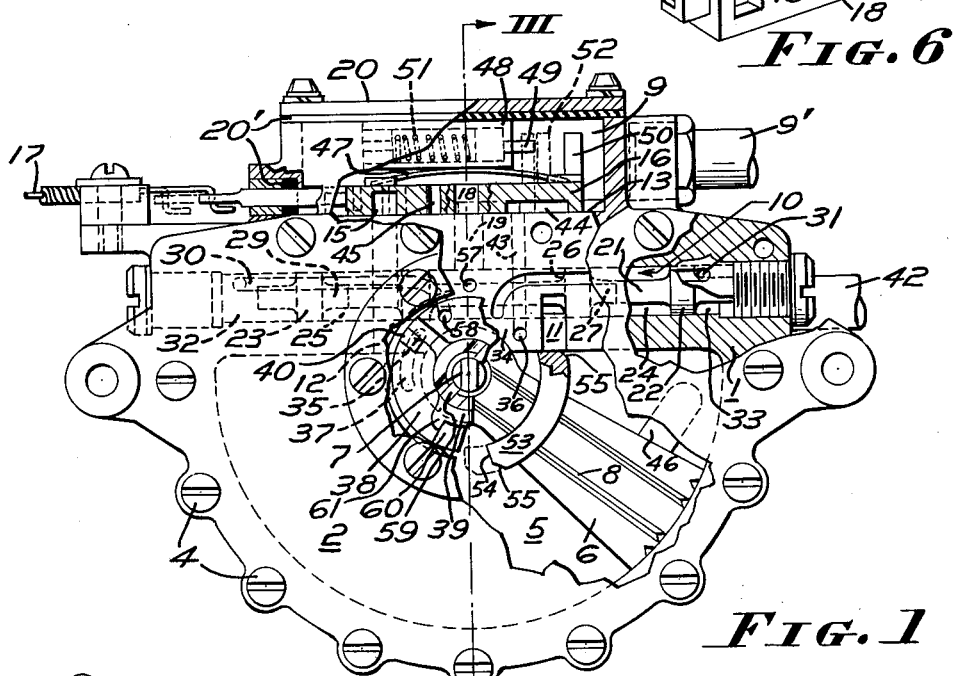
FIG. 1 is a side elevation of the improved windshield cleaner motor, portions being broken away for clearness of disclosure.

FIG. 1 shows the motor piston 6 at the start of its clockwise stroke, the shuttle valve 21 having been shifted to the right now ready to admit the hydraulic pressure from the port 19 through the chamber port 11 into the motor chamber at the right side of the piston, while connecting the exhausting chamber port 12, via passage 15, port 14, exhaust recess 25 to the outlet passage for clockwise movement of the piston and the evacuation of the liquid in advance thereof.

The back and forth movement of the shuttle valve is imparted by the hydraulic pressure as alternately applied to the opposite pressure heads 22, 23 through ducts 30 and 31 that open respectively into the motor-forming compartments 32 and 33 of the chamber 10. These ducts open through a valve seat 34 alongside of exhaust ducts 35 and 36 respectively and are adapted to be alternately joined by a respective one of the two recesses 37 formed in the underside of the pilot valve 38 of disc form that is pivoted on the motor shaft 7 and designed to be rocked thereby through a driver or kicker 39 engaging one or the other of the spaced shoulders 40 and 41 on the valve disc following a limited play. The two exhaust ducts 36 and 35 for the shuttle valve extend through the body 1 and open through its back face into outlet passage 28 for return through the outlet conduit 42 to the source of pressure.

For parking the wipers, the exhaust duct 36 has an upright extension 43 opening through the valve seat 13 for being connected to the port 19 by an angular recess 44 in the control valve when the latter is in its parking position, at which time the parking port 45, also formed in the control valve, registers with the port 12. This parking port will connect the pressurized chamber 9 through the chamber port 12 to the motor chamber to cause the piston 6 to move counterclockwise, FIG. 1, under the pressure differential set up and until arrested by the piston carried stop pin 46 which may abut the overlying wall of the chamber. During this parking movement of the vane piston, the fluid ahead of the latter will be displaced through port 11, and out into the outlet passage, either through exhaust port 27, or through port 19, the angular recess 44, upright extension 43 and exhaust duct 36, depending upon the position of the shuttle valve 21 at the time the control valve is moved to a parked position.

The control valve is held on its seat by a spring 47 that reacts against an overhanging part 48 which houses a spring backed member 49. When it is desired to park the wiper, the control valve is pulled from its running position to its parking position in which the ports 44 and 45 are brought into use. During this valve movement a shoulder 50 on the valve will engage and depress the member 49 against its spring 51 so that upon the release of the knob the spring backed member will partly return the valve to a neutral position, such as is indicated at 52, in which position the pressure supply ports 18 and 45 will be blocked to preclude the pressure in chamber 9 from reaching the windshield wiper motor. Thereby the wiper motor will be protected from the operating pressure whenever the wipers are not in use.

With a high liquid pressure supply available, a fast wiper action, running as high as two hundred strokes and more per minute, is obtainable. To protect the motor and to counteract the inertia in the fast moving parts thereof, the vane piston is provided with a piston-cushioning port-throttling valve 53 which serves to restrict the ports 11 and 12, 15, 14, when they act to exhaust. Thus, the displacement of fluid from in front of the piston is retarded to dampen the piston as it approaches the end of its stroke. This restriction is accomplished by the valve face 54 seating over the respective chamber port 11 (12), to substantially close the port, each face having a chamfer 55 to bleed or meter the escaping fluid. This restriction provides a dashpot action to retard the piston movement at the time when the pilot valve 38 reverses the hydraulic pressure on the shuttle valve to quickly shift it to its other operative position whereupon the pressure is reversed in the motor chamber.

To convert the restricted, now exhausting, chamber port 11 into a pressure supplying port and to insure a quicker start of the return movement of the piston, the port throttling valve 53 is yieldably mounted on the piston so that the initial application of the reversed pressure will displace the valve face 54 away from the port 11 to fully open the same. In the illustrated embodiment, the throttling valve is slidably mounted on the piston and projects forwardly and rearwardly therefrom, the broken line showing in FIG. 1 of this valve indicating the position on the piston to which it is initially moved hydraulically to fully open the now supplying port 11, in which position the throttling valve will be pressure-held until it seats upon the chamber port 12, 15, 14 to throttle it for checking the piston movement preliminary to starting a new stroke.

The pilot valve 38 is enclosed within a chamber 56 which is pressurized through a duct 57 leading from the valve chamber 10 adjacent the port 19. This duct 57 opens directly into the chamber 56, at a point that is located outwardly beyond the periphery of the pilot valve, the latter being formed with an aperture or port 58 to register with one or the other of the two ducts 30, 31 to establish communication between the pressurized chamber and the respective one of the motor compartments 32, 33, the unconnected compartment being connected by one of the recesses 37 to the corresponding exhaust duct 36, 35.

With the parts in the position shown in FIG. 1, the piston has completed its counterclockwise stroke, the throttling valve 53 has seated over the chamber port 11 and has restricted the exhaust flow, the shaft pin 59 has brought the driver 39 against the shoulder 40 and moved the pilot valve 38 to connect the motor compartment 32 to the pressurized pilot valve chamber 59 through port 58 and duct 30, the motor compartment 33 has been opened to the outlet passage 28 via duct 31 and the right-hand recess 37 into port 36, and the shuttle valve has responded to the pressure differential by moving to its right-hand operative position. Whereupon, the piston will start its clockwise stroke by unseating the port-restricting valve 53 and responding to the fluid flow indicated by the arrows in FIG. 8. The shuttle valve is pressure-held in its right-hand position until the driver 39 at the end of the stroke brings the pilot valve 38 clockwise around to open the duct 31 to the pressurized pilot chamber through port 58 and to vent the compartment 32 to the exhaust passage 28 via the left-hand recess 37 for shifting the shuttle valve to its left-hand operating position. The two operating positions for the shuttle valve are indicated in FIG. 9 by the full and dotted lines, as at 23.

In operation, to start the motor, the control valve 16 is moved to its running position, whereupon the pressure from the pressurized chamber 9 will flow through the registering ports 18, 19 into the medial pressure recess 26 of the shuttle valve 21 and from thence through one or the other of the chamber ports 11 and 12 to drive the piston either clockwise or counterclockwise until its movement is dampened or retarded by the throttling valve 53. If the pressure is being admitted through chamber port 12, the piston will move counterclockwise; and if the pressure is being admitted through chamber 11, the piston movement will be clockwise. Toward the end of each stroke the shaft pin 59 will move the driver 39 against one of the shoulders 40, 41 to move the valve 38 for changing the pressure differential on the shuttle valve. The two operative positions of the valve 38 are determined by a fixed stop 60 with which the shoulders 61 on the driver 39 alternately engage.

The medial recess 26 is always pressurized when the motor is running and shifts alternately over the two chamber ports to admit pressure to the motor chamber at the corresponding side of the piston. At the start of each stroke, the entering pressure will unseat the throttling valve 53 for free entrance of the fluid into the motor chamber for quicker response of the piston. This unseating action of the throttling valve is accomplished independently of the piston by reason of its play mounting and will project the throttling valve further in advance of the position, such as is shown by the dotted lines in FIG. 1, in which position it is held by the driving pressure now working on the entire back face of the piston, and as the piston approaches its limit of movement the projected shock absorbing throttling valve will seat upon the exhausting chamber port and dampen the piston. The piston oscillates rapidly under high pressure and by reason of the cushioning throttle valve the faster piston movement is checked to a practical extent for quietness as well as in counteraction of the inertia in the moving parts of a windshield cleaner before reversing the wipers. The pilot valve 38 may be pressed against its seat 34 by means of a spring 38′.

For parking the wiper, the control valve 16 is shifted to the extreme left (broken line) position in FIG. 1 to connect the pressurized chamber 9 through the parking port 45 and chamber port 12 to the left side of the motor chamber 5, as schematically illustrated in FIG. 9. This connection will admit fluid pressure to drive the piston counterclockwise and evacuate the right side of the chamber by displacing the spent fluid out through the chamber port 11 and the exhaust port 27, when the shuttle valve is in the dotted line position of FIG. 9, or back up through the port 19 and the angular recess 44, down through the upright extension 43 and out through the exhaust duct 36 into the outlet passage 28, when the shuttle valve is in the full line position. Thus, the motor may be arrested or parked with the shuttle in either position. This also serves to evacuate the pilot valve chamber 56 since the medial pressure recess 26 is blocked off from the pressurized chamber 9. Further, the wiper will always be parked in one terminal position. It will be appreciated that during the act of parking the motor the piston will move relative to the throttling valve, which latter is then seated over the chamber port 11, to bring the piston closer to the overhanging bodywall. Upon the release of the control valve, the spring 51 will restore the control valve to the position indicated at 52 in which position all of the ports in the valve seat 13 will be closed. Consequently, the wiper motor will be protected from the transmission unit whenever the windshield cleaner is not in use.

The foregoing description has been given in detail without thought of limitation since the inventive concept is capable of assuming other physical embodiments without departing from the scope of the appended claims and the spirit of the invention.

What is claimed is:

1. A windshield cleaner motor having first and second chambers, said first chamber having a piston therein associated with a shaft journalled for oscillation, said first chamber having ports at opposite sides of the piston, a pressure responsive shuttle valve housed within a third fluid conducting chamber and having conduit means registering with fluid distributing passages for operatively applying fluid under pressure to one side of the piston while permitting fluid to be exhausted from the other side of the piston to thereby oscillate said piston, opposed motor compartments associated with said shuttle valve, dampening means coordinated with the movement of the piston and acting to restrict the fluid escape from the side of the piston being exhausted, a pilot valve in said second chamber actuated back and forth by the shaft to apply pressure alternately to one shuttle valve compartment and then the other while exhausting the opposing one of said compartments to allow the shuttle valve to shift, and control valve means having two operative positions, one for admitting pressure to the valves and the motor piston for operating the latter, and the other to park the motor piston.

2. A windshield cleaner motor having a chamber with a piston therein associated with a shaft supported by side walls of the chamber, said chamber having ports at opposite sides of the piston, a pressure receiving spool type shuttle valve having pressure receiving compartments connecting with fluid distributing passages for operatively applying pressure to the piston, said valve being shiftable back and forth between operating positions for admitting fluid pressure to the piston through the chamber ports for reciprocating the piston, a pilot valve housed within a second chamber paralleling said first chamber and movable back and forth by the shaft to apply pressure alternately to one valve compartment and then the other while exhausting the opposing one of said compartments to allow the shuttle valve to shift, a speed control valve having operative positions, one for operatively admitting pressure to said second chamber and to the shuttle valve and motor piston or operating the latter and another position to effect the parking of the motor piston, and piston dampening means carried by the piston for restricting the exhausting one of said chamber ports, said dampening means yielding away from said one exhausting port when admitting fluid therethrough into the motor chamber to initiate the next following stroke of the piston.

3. A windshield cleaner motor having a motor chamber having ports at opposite sides, a piston movable back and forth in the chamber between the chamber ports, a pressurized valve chamber and a control valve in the valve chamber to open and close communication with the motor chamber through the chamber ports, throttling valve means coordinated with movement of the piston and operable to restrict said chamber ports to retard the escape of exhausting fluid from in front of the piston to provide limited shock-absorbing cushion therefor, a pressure responsive shuttle valve operatively reversing the pressure differential on the piston, and a second pressurized chamber including a valve operable by the piston for operatively actuating said shuttle valve.

4. A windshield cleaner motor having a chamber with a piston therein supported by an oscillatory shaft journaled in the chamber, said chamber having ports at opposite sides of the piston, a pressure responsive shuttle valve shiftable back and forth between two operating positions for operatively applying fluid pressure to the piston through the chamber ports, said shuttle valve also having spaced exhaust recesses, one for each chamber port, and an intermediate pressure recess alternately registrable with the chamber ports, opposed motor compartments operatively associated with said shuttle valve, a pilot valve movable back and forth by the shaft to connect the pressure recess alternately to one motor compartment and to exhaust the opposing compartment alternately through the spaced exhaust recesses to so shift the shuttle valve, a control valve having a running position for pressurizing the pressure recess and a parking position for bypassing the pressure recess to park the piston.

5. A windshield cleaner motor having a chamber with a piston therein supported by an oscillatory shaft journaled in the chamber, said chamber having ports at opposite sides of the piston, a pressure responsive shuttle valve shiftable back and forth between two operating positions for operatively applying fluid pressure to the piston through the chamber ports, said shuttle valve also having spaced exhaust recesses, one for each chamber port, and an intermediate pressure recess alternately registrable with the chamber ports, opposed motor compartments operatively associated with said shuttle valve, a pilot valve movable back and forth by the shaft to connect the pressure recess alternately to one motor compartment and to exhaust the opposing compartment alternately through the spaced exhaust recesses to so shift the shuttle valve, a control valve having a running position for pressurizing the pressure recess and a parking position for bypassing the pressure recess to park the piston, said control valve having parking port means operable jointly with the shuttle valve to exhaust the motor chamber through the shuttle valve in either position thereof.

6. A windshield cleaner motor comprising a motor chamber, a piston movable back and forth in the chamber, the chamber having combined inlet and outlet ports at opposite sides of the piston, and a port restricting valve means supported by the piston and operable to alternately restrict one port and then the other on successive strokes of the piston to retard the exhausting flow in advance of the moving piston, said valve means being fluid responsive to project it to a position in front of the moving piston for timing its port restricting shock-absorbing function before the end of the respective piston stroke and movable by a reversal in the pressure flow to fully open the port for the succeeding stroke of the piston.

7. A windshield cleaner motor having a substantially semi-circular chamber with a piston therein supported by a shaft journaled for oscillation in the chamber, said chamber having ports at opposite sides of the piston, a pressure responsive spool type shuttle valve having fluid distributing passages, said valve being shiftable back and forth between operating positions for operatively applying fluid pressure to the piston through said fluid distributing passages to said chamber ports for reciprocating the piston, opposed motor compartments operatively associated with said shuttle valve, a pilot valve movable back and forth by said shaft to apply pressure alternately to one motor compartment and exhaust the opposing compartment to so shift the shuttle valve, and a control valve having two operative positions, first fluid distributing passages operatively associated with said control valve in a first position for admitting fluid under pressure to the valves and the motor for operating the latter, second fluid distributing passages operatively associated with said control valve in a second position for causing fluid under pressure to flow to one side of said piston to thereby move said motor piston directly to a parked position from any intermediate position it occupies during its travel, and dampening means mounted on said piston for restricting the flow of fluid relative to the chamber at the end portions of piston travel.

8. A windshield cleaner motor having a substantially semi-circular chamber with a piston therein and ports at opposite sides of the piston, a shaft journaled for oscillation in the chamber and connected to the piston, a pressure responsive shuttle valve having fluid distributing passages for operatively applying pressure to the piston, opposed motor compartments operatively associated with said shuttle valve, said valve being shiftable back and forth between two operating positions for operatively applying fluid pressure to the piston through the chamber ports for reciprocating the piston, a pilot valve movable back and forth by the shaft to apply pressure alternately to one of the motor compartments and to exhaust the opposing one of said compartments to so shift the shuttle valve, a control valve having two operative positions, one for admitting pressure to the valves and the other to park the motor piston, and piston dampening means carried by the piston and acting to restrict the fluid escape alternately through the chamber ports.

9. A hydraulic windshield cleaner motor having a chamber with a piston therein operatively connected to a wiper actuating shaft for oscillating the latter, a control valve for the motor, a shuttle valve interposed between the motor chamber and the control valve and responsive to fluid pressure for movement from one to the other of two operative positions for operatively applying pressure to the piston to move it back and forth, and a pilot valve operable by the shaft to apply pressure to the shuttle valve to so shift it for so directing pressure fluid into and out of the motor chamber, said control valve having a parking port registrable with a port in the chamber to move the piston to a parking position.

10. A hydraulic windshield cleaner motor comprising a motor chamber having a piston therein operatively connected to a wiper actuating shaft for oscillating the latter, a valve chamber having a control valve therein, a shuttle valve chamber interposed between the first two chambers and having a pressure reversing valve therein, chamber ports at opposite sides of the piston, automatic valve mechanism operable by the shaft to alternately apply pressure to the opposite ends of the shuttle valve for connecting the motor chamber to longitudinally spaced exhaust recesses in the shuttle valve for discharge through exhaust ports, said shuttle valve also having a medial pressurized recess in communication with the control valve chamber, said control valve having a parking port bypassing the shuttle valve and the valve mechanism and registrable with one of said chamber ports to move the piston to a parking position.

11. A windshield cleaner comprising a motor chamber, a piston movable back and forth in the chamber, the chamber having combined inlet and outlet ports at opposite sides of the piston, and a port restricting valve means movably supported by the piston and operable to alternately restrict the ports on successive strokes of the piston to retard the exhaust flow, said valve means being fluid responsive to project it to a position in front of the moving piston for timing its port restricting function before the end of the respective piston stroke and movable by a reversal in the pressure flow to fully open the port for the succeeding stroke of the piston.

12. A pressure operated windshield wiper motor comprising a housing, a piston chamber in said housing, a piston mounted for oscillatory movement in said piston chamber, valve means responsive to the position of said piston for alternately admitting fluid under pressure to said piston chamber on opposite sides of said piston, control means actuable to a running or a parking position, means operatively associated with said control means for causing said piston to be moved directly to a parked position regardless of the condition of said valve means, and means operatively associated with said control means for preventing fluid pressure from communicating with either said valve means or said piston chamber after said motor has been parked.

13. A windshield cleaner motor having a chamber with a piston therein and ports at opposite sides of the piston, a shaft journaled for oscillation in the chamber and connected to the piston, a pressure responsive shuttle valve having fluid distributing passages for operatively applying pressure to the piston, opposed motor compartments operatively associated with said shuttle valve, said valve being shiftable back and forth between two operating positions for operatively applying fluid pressure to the piston through the chamber ports for reciprocating the piston, a pilot valve movable back and forth in timed relationship with the shaft to apply pressure alternately to one of the motor compartments and to exhaust the opposing one of said compartments to so shift the shuttle valve, a control valve having two operative positions, one for admitting pressure to the valves and the other to park the motor piston, and piston dampening means coordinated with movement of the piston and acting to restrict the passage of fluid through the chamber ports.

14. A pressure operated windshield wiper motor comprising a housing, a piston chamber in said housing, a piston mounted for oscillatory movement in said piston chamber, valve means responsive to the position of said piston for alternately admitting fluid under pressure to said piston chamber on opposite sides of said piston, control means actuable to a running or a parking position, means operatively associated with said control means for causing said piston to be moved directly to a parked position when said control means are moved to a parking position, and means operatively associated with said control means for preventing fluid at normal motor operating pressure from communicating with either said valve means or said piston chamber after said motor has been parked.

15. A hydraulic windshield wiper motor comprising a housing, a first chamber in said housing, a second chamber in said housing, a shaft journaled for oscillation in said housing and extending into both said first and second chambers, a piston mounted on said shaft and positioned in said first chamber, a pilot valve mounted on said shaft and positioned in said second chamber, a third chamber in said housing, a spool type of shuttle valve mounted for reciprocation in said third chamber, piston means mounted in opposed relationship on said spool type shuttle valve, compartments in said housing adapted to receive said piston means of said spool type of shuttle valve, a control valve, first duct means associated with said control valve and said spool type of shuttle valve and said housing for routing hydraulic fluid under pressure to one side of said piston in said first chamber while permitting hydraulic fluid on the other side of said piston to be exhausted, second duct means associated with said pilot valve and said housing for routing hydraulic fluid under pressure to one of said compartments associated with said shuttle valve while permitting hydraulic fluid in the other of said compartments to be exhausted and then reversing the flow of hydraulic fluid to and from said compartments in synchronism with piston movement to thereby cause said shuttle valve to shift and reroute the flow of hydraulic fluid to and from said first chamber to thereby reverse the direction of travel of said piston in said first chamber and thereby reverse the direction of movement of said shaft, third duct means associated with said control valve for routing hydraulic fluid from said source of fluid pressure to a portion of said first chamber on one side of said piston when said control valve is moved to a motor parking position to terminate the flow of hydraulic fluid which causes said piston to continuously move back and forth in said first chamber during motor operation and to cause said piston in said first chamber to move to a parking position, means operatively associated with said control valve means for preventing the hydraulic fluid under normal motor operating pressure from communicating with said motor when it is in a parked condition, and piston dampening means operable in synchronism with movement of said piston for varying the rate of flow of hydraulic fluid relative to said first chamber.

References Cited in the file of this patent
UNITED STATES PATENTS

| | | |
|---|---|---|
| 1,363,333 | Lower | Dec. 28, 1920 |
| 1,717,699 | Lippert | June 18, 1929 |
| 2,202,023 | Parker | May 28, 1940 |
| 2,280,588 | Knott et al. | Apr. 21, 1942 |
| 2,283,397 | Tucker | May 19, 1942 |
| 2,346,502 | O'Shei | Apr. 11, 1944 |
| 2,348,346 | Horton et al. | May 9, 1944 |
| 2,556,698 | Loewe | June 12, 1951 |
| 2,778,338 | Shafer | Jan. 22, 1957 |
| 2,802,458 | McDonnell et al. | Aug. 13, 1957 |